United States Patent
Spencer et al.

(10) Patent No.: US 12,030,416 B2
(45) Date of Patent: Jul. 9, 2024

(54) RETRACTABLE HANDLE FOR RECREATIONAL VEHICLES

(71) Applicant: MORRYDE INTERNATIONAL, INC., Elkhart, IN (US)

(72) Inventors: Michael A. Spencer, Stevensville, MI (US); Ryan Mason, Niles, MI (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 0 days.

(21) Appl. No.: 17/868,928

(22) Filed: Jul. 20, 2022

(65) Prior Publication Data

US 2023/0022503 A1 Jan. 26, 2023

Related U.S. Application Data

(60) Provisional application No. 63/224,203, filed on Jul. 21, 2021.

(51) Int. Cl.
 *B60N 3/02* (2006.01)

(52) U.S. Cl.
 CPC ............ *B60N 3/023* (2013.01); *B60N 3/026* (2013.01)

(58) Field of Classification Search
 CPC . B60N 3/023; B60N 3/026; B60P 3/34; B60P 3/36; E04B 1/34336; B04F 11/1865
 USPC ........................................... 296/1.02; 256/67
 See application file for complete search history.

(56) References Cited

U.S. PATENT DOCUMENTS

| | | | | |
|---|---|---|---|---|
| 4,029,352 A | * | 6/1977 | Evans | E04F 11/18 52/9 |
| 4,261,550 A | * | 4/1981 | Gregory | B60N 3/00 52/150 |
| 5,024,420 A | * | 6/1991 | Downing | E04B 1/34336 52/150 |
| 5,280,934 A | * | 1/1994 | Monte | B60R 3/02 182/127 |
| D374,581 S | * | 10/1996 | Kiniry | D12/421 |
| 6,425,572 B1 | * | 7/2002 | Lehr | B60R 3/02 182/127 |
| 6,974,134 B1 | * | 12/2005 | Macri | E05B 1/0015 16/412 |
| 7,011,297 B1 | * | 3/2006 | Guillot | B60P 3/36 256/67 |
| 8,613,475 B1 | * | 12/2013 | Statz | B60R 3/007 296/57.1 |
| 2016/0039348 A1 | * | 2/2016 | Bowser | B60J 5/0413 296/37.13 |
| 2016/0059788 A1 | * | 3/2016 | Lu | B60R 5/045 296/37.16 |

* cited by examiner

*Primary Examiner* — Jason S Morrow
(74) *Attorney, Agent, or Firm* — MARSHALL, GERSTEIN & BORUN LLP

(57) ABSTRACT

A handle for a recreational vehicle is described that includes a handrail and a support arm. The handrail has a proximal end configured to be pivotably coupled relative to structure of a recreational vehicle and an opposite distal end. The support arm has a first end configured to be pivotably coupled relative to structure of a recreational vehicle and an opposite second end slidingly coupled relative to the handrail. With this configuration, the handrail can be pivoted from a storage position extending along the recreational vehicle and a use position extending outwardly from the recreational vehicle causing the second end of the support arm to slide towards the distal end of the handrail.

20 Claims, 3 Drawing Sheets

RETRACTABLE HANDLE FOR RECREATIONAL VEHICLES

CROSS-REFERENCE TO RELATED APPLICATION

This application claims the priority benefit of U.S. Provisional Application No. 63/224,203, filed Jul. 21, 2021, which is hereby incorporated by reference in its entirety.

FIELD OF THE DISCLOSURE

The present disclosure generally relates to handles for recreational vehicles and, more particularly, to retractable handles for recreational vehicles.

BACKGROUND

Recreational vehicles ("RVs") include a variety of structures and components that require a user to climb or otherwise stand in an elevated position. For example, RVs can include staircases to reach elevated doorways, suspended gates, and so forth. In many cases, a handle would be helpful for a user to support themselves in these areas. However, a need exists for handles with improved functionality and storage configurations.

SUMMARY

In accordance with a first aspect, a handle for a recreational vehicle is described herein that includes a handrail and a support arm. The handrail has a proximal end configured to be pivotably coupled relative to structure of a recreational vehicle and an opposite distal end. The support arm has a first end configured to be pivotably coupled relative to structure of a recreational vehicle and an opposite second end slidingly coupled relative to the handrail. With this configuration, the handrail can be pivoted from a storage position extending along the recreational vehicle and a use position extending outwardly from the recreational vehicle causing the second end of the support arm to slide towards the distal end of the handrail. In one example, the second end of the support arm can be adjacent to the proximal end of the handrail in the storage position and adjacent to the distal end of the handrail in the use position.

In some examples, the handle can include a sliding member coupled to the handrail to slide therealong when the handrail is pivoted between the storage and use positions; wherein the support arm is pivotably coupled to the sliding member.

In further examples, the sliding member and handrail can frictionally engage one another to hold the handrail in the use position; the handle can include a lock pin configured to restrict movement of the sliding member relative to the handrail to hold the handrail in the use position.

In further examples, a length of the sliding member can be configured to extend past the distal end of the handrail with the handrail in the use position to provide an extended handrail. If desired, the sliding member can be configured to telescope with respect to the handrail.

In further examples, the handrail can have a tubular body defining an inner channel configured to receive sliding member therein, where the tubular body defines a downward opening through which the support arm extends. If desired, the tubular body can include lips that extend under sliding member to retain the sliding member within the inner channel, where interior edges of the lower lips define the downward opening.

In further examples, the handrail and sliding member can be coupled together with a track and pin configuration with the pin received within the track and configured to slide along therein. If desired, the handrail can include a track on an interior surface thereof and the sliding member can include a pin received within the track to guide movement of the sliding member relative to the handrail. The sliding member can include a plurality of pins received within the track; and/or the handrail can include opposing sidewalls, each of the sidewalls can include a track on an interior surface thereof, and the sliding member can include pins extending outwardly from opposite sides thereof to guide movement of the sliding member relative to the handrail. In a another example, the handle can include a pivot member pivotably coupling the support arm to the sliding member, where the pins extend outwardly from opposite sides of the sliding member at least partially including ends of the pivot member.

In any of the above examples, the handle can include a mounting bracket, a first pivot connection between the proximal end of the handrail and the mounting bracket, and a second pivot connection between the first end of the support arm and the mounting bracket. If desired, the second pivot can include lateral tabs of the mounting bracket and a bar of the first end of the support arm configured to extend between the lateral tabs of the mounting bracket.

In any of the above examples, the first end can include a first portion of a pivot connection and the handrail can be sized so that the distal end of handrail spaced from and disposed adjacent to the pivot connection in the storage position; and/or the support arm can have a unitary structure.

In any of the above examples, the handle can include a retention lock to hold the handrail in the storage position. In further examples, the retention lock can be a magnet and/or coupled to the support arm to releasably engage the mounting bracket to hold the handrail in the storage position.

DETAILED DESCRIPTION

A retractable handle for a recreational vehicle ("RV") is described herein that can be manipulated between a storage position with the handle stowed against the RV and a use position with a handrail of the handle extending outwardly from the RV to provide support for a user. The handle can advantageously be secured to the RV adjacent to any desired structure, such as doors, tailgates, or other elevated components where a user might need. The handle includes a handrail and a support arm with ends pivotably mounted relative to the RV. The opposite end of the support arm slides relative to the handrail, allowing the handrail to be pivoted from the storage position extending generally parallel to a surface of the RV and the use position.

Figure 1:
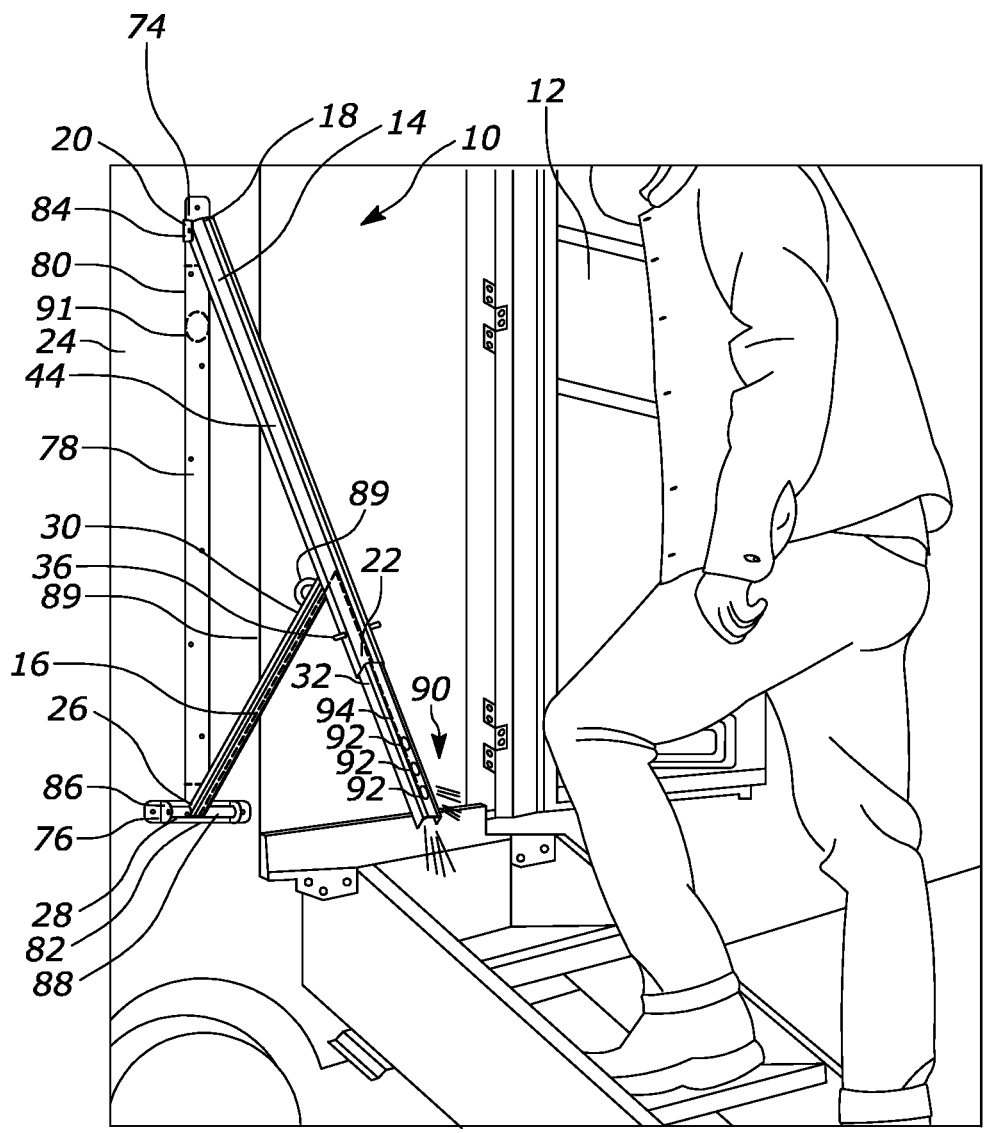
FIG. 1 is a perspective view of a retractable handle for a recreational vehicle in a use position relative to the recreational vehicle in accordance with various embodiments.
Figure 2:
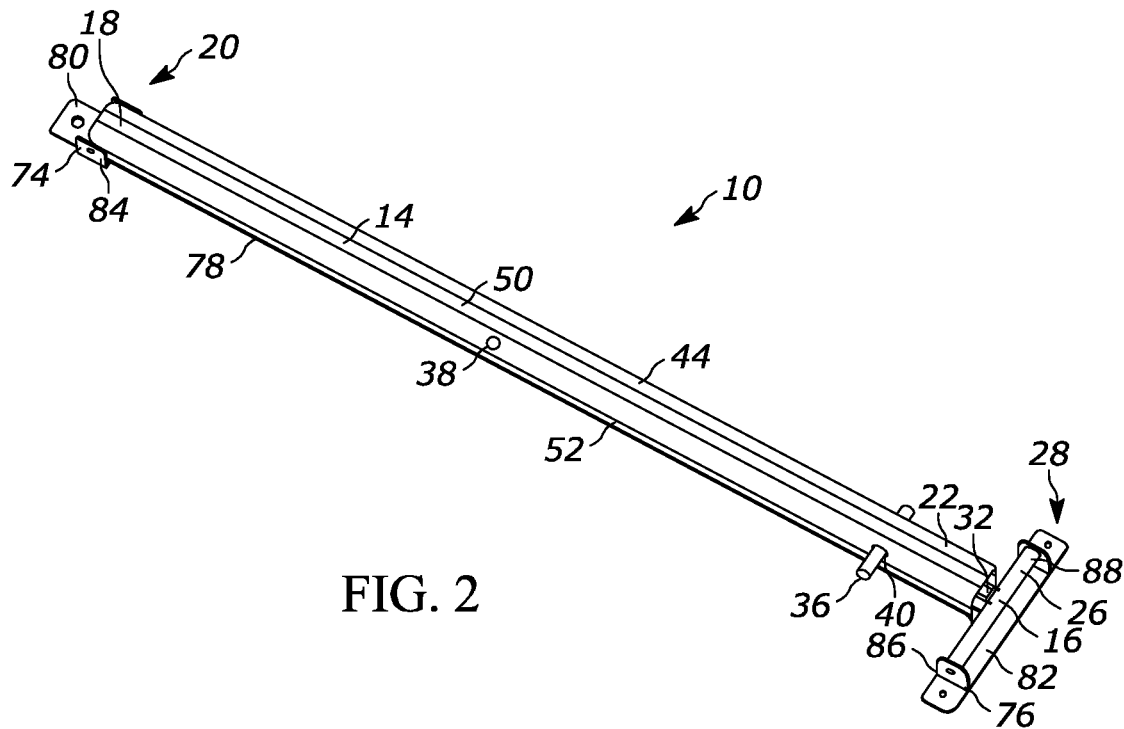
FIG. 2 is a perspective view of the retractable handle of FIG. 1 in a storage position.

Turning now to FIGS. 1-5, a retractable handle 10 for a RV 12 is shown that includes a handrail 14 and a support arm 16. The handrail 14 has a proximal end 18 pivotably coupled relative to the RV 12 with a first pivot connection 20 and an opposite, distal end 22. This configuration allows the handrail 14 to be pivoted about the pivot connection 20 from a use position, as shown in FIG. 1, to a storage position, as shown in FIG. 2. In the storage position, the handrail extends parallel to or generally, e.g., between 0-5 degrees or between 0-3 degrees, parallel to a surface 24 of the RV 12 to which the handle 10 is mounted and, in the use position, the handrail 14 extends outwardly from the surface 24 of the RV 12.

The support arm 16 has a first end 26 pivotably coupled relative to the RV 12 with a second pivot connection 28 and an opposite, second end 30. As shown, the second end 30 of the support arm 16 is slidingly coupled to the handrail 14, such that the second end 30 slides along a length of the handrail 14 as the handrail 14 is pivoted between the storage and use positions. For example, the second end 30 slides toward the distal end 22 as the handrail 14 is pivoted to the use position and slides toward the proximal end 18 of the handrail 14 as the handrail 14 is pivoted to the storage position. With this configuration, the second end 30 of the support arm 16 is adjacent to the proximal end 18 of the handrail 14 in the storage position and adjacent to the distal end 22 of the handrail 14 in the use position. Further, the second end 30 of the support arm 16 can be pivotably coupled relative to the handrail 14, such that the handrail 14 and support arm 16 can be pivoted relative to one another as the handrail 14 is pivoted between the use and storage positions.

In one example, the support arm 16 can have a unitary structure, such that the arm 16 has a single piece construction. It will be understood that a single piece construction can include components permanently attached to one another, such as by welding and the like. In another example, the support arm 16 can have a fixed length.

In the illustrated example, in order for the handrail 14 to lie flat along the RV 12 in the storage position, the first and second pivot connections 20, 28 can be spaced from one another a predetermined distance, and the handrail can be sized to be less than the predetermined distance, such that the distal end 22 of handrail 14 is spaced from and disposed adjacent to the second pivot connection 28 in the storage position.

As shown in the figures, the handle 10 can further include a sliding member 32 that is coupled to the handrail 14 to slide therealong when the handrail 14 is pivoted between the storage and use position. Advantageously, the support arm 16 is pivotably coupled to the sliding member 32 with a third pivot connection 34, such that the support arm 16 is slid relative to the handrail 14 as the sliding member 32 shifts therealong.

If desired, the sliding member 32 can be utilized to provide an extended handrail length. As shown in FIG. 1, the sliding member 32 can be sized so that a distal end portion 36 thereof extends past the distal end 22 of the handrail 14 with the handrail 14 in the use position. This configuration allows the handrail 14, and thus the handle 10 as a whole, to have a compact configuration while still providing an extended support length. In one example, the sliding member 32 can be sized to be disposed within the length, i.e., not extend past the proximal or distal ends 18, 22, of the handrail 14 with the handrail 14 in the storage position, so that the handrail 14 can extend to be directly adjacent to the second pivot connection 28, maximizing the compact configuration of the handle 10.

The handrail 14 can be held in the use position and/or the storage position by any desired mechanism. In one example, the handrail 14 can frictionally engage the sliding member 32 and/or the support arm 16, such that the handrail 14 is held in the use position under expected force applied thereto. The handle 10 can be configured so that, in the use position, the support arm 16 is at an angle of between 75-105 degrees relative to the handrail 14, at an angle of between 80-100 degrees relative to the handrail 14, at an angle of between 85-95 degrees relative to the handrail 14, or at an angle of 90 degrees relative to the handrail 14. With this configuration, force applied to the handrail 14 is directed along the longitudinal length of the support arm 16 rather than at an angle or at a significant angle, e.g. greater than 15 degrees, greater than 10 degrees, or greater than 5 degrees in either direction, with respect thereto. This allows a relatively small frictional force between the handrail 14 and sliding member 32 and/or support arm 16 to hold the handrail 14 in the use position. Thereafter, when a user desires to move the handle 10 to the storage position, the user can push the second end 30 of the support arm 16 towards the proximal end 18 of the handrail 14 to overcome the frictional force and begin pivoting the handrail 14. In this example, gravity or friction between the handrail 14 and the sliding member 32 and/or support arm 16 can be relied on to hold the handrail 14 in the storage position.

In another example, the handle 10 can include a lock pin 36 that can be used to selectively engage the handrail 14 and one or both of the sliding member 32 or support arm 16 to hold the components in a desired orientation relative to one another. Pursuant to this, the handrail 14 can include openings 38, 40 that align with openings 42 in one or both of the sliding member 32 or support arm 16 or the lock pin 36 mounted thereto in one or both of the storage position or use position. The user can then insert the lock pin 36 into the openings 38, 40, 42 or the lock pin 36 can automatically engage the openings 38, 40 to hold the handrail 14 in a desired position. The lock pin 36 can have any desired configuration, such as a pin, a spring loaded plunger, a cotter pin, a bolt, or the like.

Figure 5:
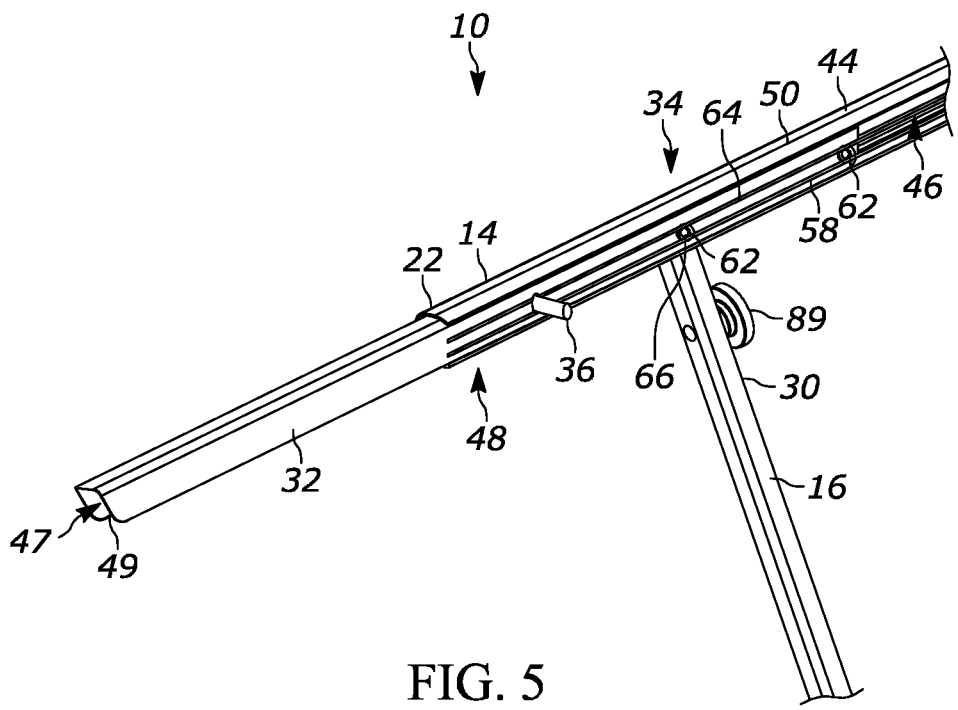
FIG. 5 is a cross-sectional view of the retractable handle of FIG. 1 showing a track and pin coupling configuration between a sliding member and a handrail of the retractable handle.

The sliding member 32 can be coupled to the handrail 14 by any suitable structure. For example, the sliding member 32 and the handrail 14 can be coupled together with tongue-and-groove or other interlocking components. In the illustrated example, the handrail 14 has a tubular body with a sidewall 44 defining an inner channel 46 sized to receive the sliding member 32 therein. With this configuration, the sliding member 32 can be configured to telescope with respect to the handrail 14. The sidewall 44 can further define a downward opening 48 through which the support arm 16 can extend to couple to the sliding member 32 disposed within the inner channel 46. As shown in FIG. 5, the sliding member 32 can have a similar configuration as the handrail with a tubular body defining an inner channel 47 and downward opening 49.

Figure 3:
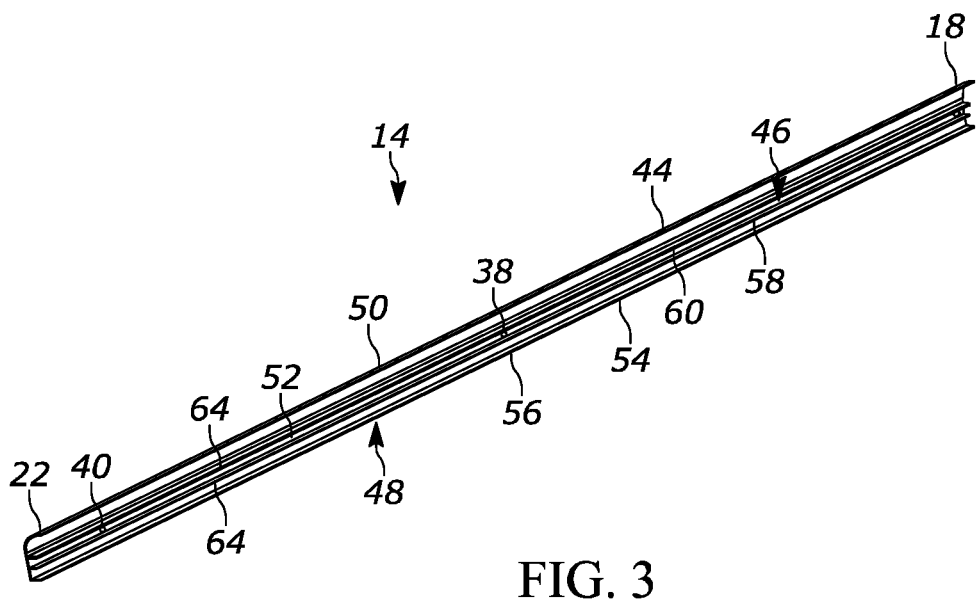
FIG. 3 is a cross-sectional view of a handrail of the retractable handle of FIG. 1.

As shown in FIG. 3, the sidewall 44 of the handrail 14 can include a top portion 50 and opposite side portions 52. If desired, the sidewall 44 can further include lips 54 that extend inwardly from bottom edges of the side portions 52 to be positioned underneath the sliding member 32 and retain the sliding member 32 within the handrail 14. In this example, interior edges 56 of the lips 54 define the downward opening 48.

Figure 4:
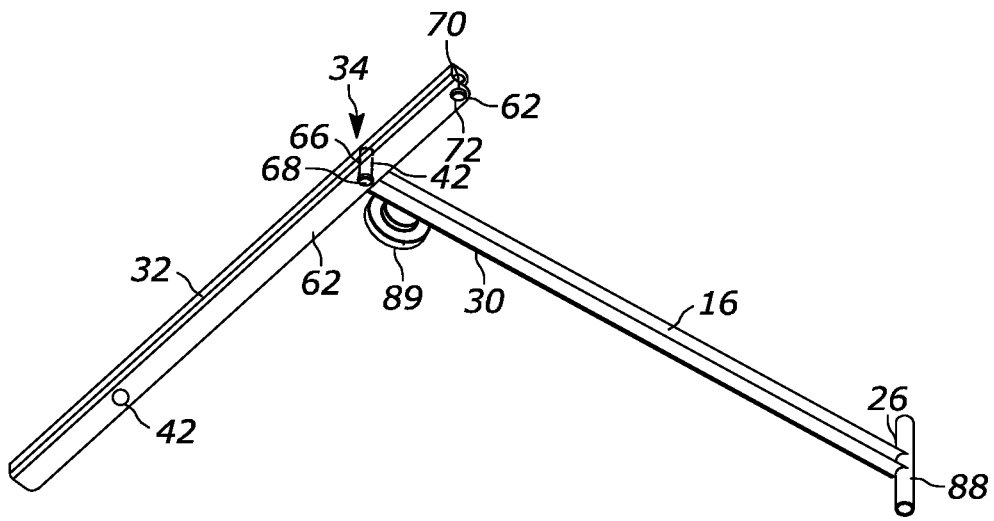
FIG. 4 is a sectional view of a sliding member and a support arm of the retractable handle of FIG. 1.

Turning to FIGS. 3-5, in one example, the handrail 14 and sliding member 32 can be slidingly coupled together with a track and pin configuration, where the pin is configured to shift within the track as the handrail 14 and sliding member 32 are moved relative to one another. As shown, the handrail 14 can include a track 58 on an interior surface 60 of the sidewall 44 and the sliding member 32 can include one or more pins 62 that are disposed within the track 58 and configured to slide along therein to guide movement of the sliding member 32 relative to the handrail 14. For example, the sliding member 32 can include two pins 62 spaced along the length thereof. As shown in FIG. 3, the track 58 can be defined by a pair of spaced walls 64. Alternatively, the opposite configuration can be utilized with the track 58 disposed on the sliding member and the pins 62 provided on the handrail 14.

Of course, additional pins 62 can be utilized if desired. By including a plurality of pins 62, force imparted on the distal end portion 36 of the sliding member 32 can be transferred to the track 58 via the pins 62 and, thus, the sliding member 32 and the handrail 14 can resist movement relative to one another and provide a more stable support.

In the example of FIGS. 3-5, the handrail 14 can include tracks 58 on both of the interior surfaces 60 of the side portions 52 of the sidewall 44 and the sliding member 32 can include pins 60 that extend laterally outwardly from opposite sides thereof to be disposed within the tracks 58. Further, as shown, each side of the sliding member 32 includes pins 62 spaced along the length thereof, such that the sliding member 32 includes four or more pins 62.

One set of pins 62 can advantageously be provided as a portion of the third pivot connection 34 as shown in FIG. 5. The third pivot connection 34 can include a pivot rod 66 that extends through the support arm 16 and sliding member 32 with ends 68 thereof at least partially providing a portion of the opposing pins 62. For example, in any of the above, the pins 62 can be at least partially provided by a grommet that, as shown in FIG. 4, includes an outwardly extending flange 70 and an upstanding collar 72.

In any of the above, the first and second pivot connections 20, 28 can couple the handrail 14 and support arm 16 directly to structure of the RV 12, such as a wall or frame thereof. For example, the first and second pivot connections can include mounts 74, 76 that are configured to pivotably couple to the proximal end 18 of the handrail 16 and the first end 26 of the support arm 16 and secure to the RV 12 by any suitable mechanism, such as fasteners, welding, adhesive, and so forth.

Alternatively, as shown in the figures, the handle 10 can include a mounting bracket 78 to which the handrail 14 and support arm 16 are pivotably coupled. This allows the handle 10 to be a stand-alone component that can be easily secured in a desired location on the RV 12 while maintaining optimal spacing between the first and second pivot connections 20, 28 given the lengths of the handrail 14, support arm 16, and sliding member 32.

As shown in FIG. 1, the mounting bracket 78 can include an elongate body with a top portion 80 forming part of the first pivot connection 20 and a bottom portion 82 forming part of the second pivot connection 28. It will be understood that the handrail 14 and support arm 16 can be pivotably mounted to the mounting bracket 78 by any desired methods. Alternatively, the mounting bracket 78 can be split with the top portion 80 and the bottom portion 82 being separate components, such as that shown in broken lines in FIG. 1.

In the illustrated example, the first pivot connection 20 includes a pair of upstanding tabs 84 of the top portion 80 of the mounting bracket 78 that receive the proximal end 18 of the handrail 14 therebetween. A pivot member, such as a pin or rod, couples the tabs 84 to the handrail 14 allowing the handrail 14 to freely pivot relative thereto. The second pivot connection 28 includes a pair of upstanding tabs 86 of the bottom portion 82 of the mounting bracket 78 that receive the first end 26 of the support arm 16 therebetween. A pivot member, such as a pin or rod, couples the tabs 86 to the support arm 16 allowing the support arm 16 to freely pivot relative thereto. If desired, the first end 26 of the support arm 16 can include a bar 88 that extends laterally relative to a longitudinal length of the support arm 16 between the tabs 86. Advantageously, the added width of the bar 88 and the resulting spacing of the tabs 86 and engagement with the bar 88 adds lateral bracing to the support arm 16 and, thus, the handle 10 as a whole. This configuration reduces side-to-side swaying of the handle 10 and allows the handle to provide better support for a person during use. Although the bar 88 is shown extending laterally a generally equal distance on both sides of the support arm 16, the bar 88 can be offset on one side or extend entirely on one side of the support arm 16, as desired.

With this configuration, the handrail 14 is able to pivot to the storage position where the handrail 14, support arm 14, and sliding member 32 all extend generally parallel to the mounting bracket 78 and the surface of the RV 12, where the distal end 22 of the handrail 14 is disposed adjacent to and above the second pivot connection 28.

In one implementation, the handle 10 can include a retention lock 89 configured to hold the handrail 14 in the storage position. The lock 89 can take any suitable form, including a magnet, a snap fit coupling, hook and loop fasteners, a cotter pin or the like extending through openings of the handle 10 and support arm 16/other structure of the handle 10 or RV 12, and so forth. In the illustrated form, the handle 10 includes a magnet 89 coupled to the support arm 16, such as the second end 30 thereof. The magnet 89 is oriented to magnetically engage the mounting bracket 78 when the support arm 16 is pivoted towards the RV 12 as the handle 10 is returned to the storage position. In the implementation utilizing a two-piece mounting bracket 78, as shown in FIG. 1, a separate mount 91 can be coupled to the RV 12 for the magnet 89 to engage when the handle 10 is in the storage position. Alternatively, the magnet 89 can be configured to engage the RV 12 directly. Other suitable forms can utilize the retention lock 89 at or adjacent to the distal end 22 of the handrail 14 to releasably engage the support arm 16, sliding member 32, mounting bracket 78, and/or RV 12 when the handle 10 is in the storage position.

If desired, as shown in FIG. 1, the handle 10 can also include a lighting assembly 90 that can be configured to illuminate the handle 10 and/or area around the handle 10, such as the ground, staircase, or other portion of the RV 12. The lighting assembly 90 includes one or more light sources 92, e.g., light emitting diodes, coupled to the handle 10. The lighting assembly 90 can include a battery power source mounted to the handle 10 or can include a wired connection with a wire 94 extending to the RV 12 to receive power therefrom. For example, the wire 94 can extend long the support arm 16 or handrail 14 and into the RV 12 through or around the mounting bracket 78, which can include an opening therefor. In the illustrated example, the light sources 92 are coupled to the sliding member 32, such as received within the inner channel 47, mounted to the side, or within an extruded side hood, and the wire 94 runs through the third pivot 34 and down the support arm 16 to the RV 12. The light sources 92 can be oriented downwardly and, optionally can be angularly adjustable, to illuminate desired areas below or to either side of the handle 10. Additionally, if desired, the light sources 92 can include one or more light sources oriented along the longitudinal axis of the sliding member 32 to project light outwardly therealong.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A handle for a recreational vehicle, the handle comprising:
    a handrail having a proximal end and an opposite distal end;
    a support arm having a first end and an opposite second end slidingly coupled relative to the handrail;
    a first pivot connection to pivotably couple the proximal end of the handrail to structure of a recreational vehicle; and
    a second pivot connection to pivotably couple the first end of the support arm to structure of a recreational vehicle, the second pivot connection comprising a mount having tabs disposed on either side of the first end of the support arm and a lateral member spanning between the tabs and secured to the first end of the support arm to rotate therewith, at least one of the tabs of the mount spaced laterally from the first end of the support arm such that the lateral member spans a distance between the at least one of the tabs and the first end of the support arm to extend a width of the second pivot connection relative to a width of the support arm to provide lateral bracing to the support arm, such that the handrail is configured to be pivoted from a storage position extending along the recreational vehicle and a use position extending outwardly from the recreational vehicle causing the second end of the support arm to slide towards the distal end of the handrail.

2. The handle of claim 1, wherein the second end of the support arm is adjacent to the proximal end of the handrail in the storage position and adjacent to the distal end of the handrail in the use position.

3. The handle of claim 1, further comprising a sliding member coupled to the handrail to slide therealong when the handrail is pivoted between the storage and use positions; wherein the support arm is pivotably coupled to the sliding member.

4. The handle of claim 3, wherein the sliding member and handrail frictionally engage one another to hold the handrail in the use position.

5. The handle of claim 3, further comprising a lock pin configured to restrict movement of the sliding member relative to the handrail to hold the handrail in the use position.

6. The handle of claim 3, wherein a length of the sliding member is configured to extend past the distal end of the handrail with the handrail in the use position to provide an extended handrail.

7. The handle of claim 6, wherein the sliding member is configured to telescope with respect to the handrail.

8. The handle of claim 3, wherein the handrail comprises a tubular body defining an inner channel configured to receive sliding member therein, the tubular body defining a downward opening through which the support arm extends.

9. The handle of claim 8, wherein the tubular body further includes lips that extend under sliding member to retain the sliding member within the inner channel, interior edges of the lower lips defining the downward opening.

10. A handle for a recreational vehicle, the handle comprising:
    a handrail having a proximal end configured to be pivotably coupled relative to structure of a recreational vehicle and an opposite distal end;
    a support arm having a first end configured to be pivotably coupled relative to structure of a recreational vehicle and an opposite second end slidingly coupled relative to the handrail, such that the handrail is configured to be pivoted from a storage position extending along the recreational vehicle and a use position extending outwardly from the recreational vehicle causing the second end of the support arm to slide towards the distal end of the handrail; and
    a sliding member coupled to the handrail to slide therealong when the handrail is pivoted between the storage and use positions; wherein the support arm is pivotably coupled to the sliding member;
    wherein the handrail includes opposing sidewalls; and the handrail and sliding member are coupled together with a track and pin configuration, the track and pin configuration comprising opposing tracks defined by ribs extending inwardly from an interior surface of each of the sidewalls of the handrail and pins coupled to and extending outwardly from opposite sides of the sliding member, the pins received within the tracks to slide along therein and guide movement of the sliding member relative to the handrail.

11. The handle of claim 10, wherein the track and pin configuration comprises a plurality of pins coupled to the sliding member and received within the track.

12. The handle of claim 10, further comprising a pivot member pivotably coupling the support arm to the sliding member, the pins of the track and pin configuration at least partially including ends of the pivot member.

13. The handle of claim 1, wherein the handrail is sized so that the distal end of handrail spaced from and disposed above the second pivot connection in the storage position.

14. The handle of claim 1, wherein the support arm has a unitary structure.

15. The handle of claim 1, further comprising a mounting bracket including the mount of the second pivot connection, the first pivot connection being between the proximal end of the handrail and the mounting bracket; and the second pivot connection being between the first end of the support arm and the mounting bracket.

16. The handle of claim 15, further comprising a retention lock configured to releasably hold the handrail in the storage position.

17. The handle of claim 16, wherein the retention lock comprises a magnet coupled to the support arm to releasably engage the mounting bracket with the handrail in the storage position.

18. The handle of claim 1, wherein the second pivot connection has a greater width than the first pivot connection.

19. The handle of claim 1, wherein both of the tabs are spaced laterally outwardly relative to a width of the handrail.

20. The handle of claim 1, wherein the lateral member is laterally offset relative to the support arm.

* * * * *